United States Patent [19]

Burckhardt

[11] 4,058,346
[45] Nov. 15, 1977

[54] MASTER BRAKE CYLINDER FOR MOTOR VEHICLES

[75] Inventor: Manfred H. Burckhardt, Waiblingen, Germany

[73] Assignee: Daimler-Benz Aktiengesellschaft, Stuttgart, Germany

[21] Appl. No.: 655,552

[22] Filed: Feb. 5, 1976

[30] Foreign Application Priority Data

Feb. 5, 1975 Germany .............................. 2504699

[51] Int. Cl.² .............................................. B60T 8/20
[52] U.S. Cl. ................................... 303/22 R; 303/61; 303/100
[58] Field of Search .................... 303/6 C, 6 R, 22 R, 303/23 R, 24 F, 61, 100

[56] References Cited

U.S. PATENT DOCUMENTS

| | | | |
|---|---|---|---|
| 3,376,079 | 4/1968 | Ryskamp | 303/22 R |
| 3,404,923 | 10/1968 | Smoren | 303/61 |
| 3,466,098 | 9/1969 | Pieren et al. | 303/61 X |

Primary Examiner—Duane A. Reger
Attorney, Agent, or Firm—Craig & Antonelli

[57] ABSTRACT

A master brake cylinder for two-circuit brake systems of motor vehicles which includes two cylinders and pistons for the two brake circuits arranged one behind the other in a tandem arrangement; the piston for the front axle brake circuit thereby has a larger diameter than the piston for the rear axle brake circuit while the pressure space for the front axle brake circuit is connected with that of the rear axle brake circuit by way of a line in which a control valve is arranged that is controlled in dependence on the vehicle load.

15 Claims, 4 Drawing Figures

MASTER BRAKE CYLINDER FOR MOTOR VEHICLES

The present invention relates to a master brake cylinder for two-circuit brake systems of motor vehicles, which includes two cylinders and pistons disposed in tandem arrangement one behind the other for the two brake circuits.

The full utilization of the transmission capability between the wheels and the road can be achieved only, if with a loaded and with a non-loaded vehicle, a different respective brake force distribution exists. It has been determined in numerous tests that optimum behavior of a vehicle during the braking operation can be achieved if a fixed matching exists between the front and rear axle brake of the vehicle which is so selected that the straight line of the installed brake force distribution intersects the associated parabola of the ideal-brake-force distribution at about 0.9.

If one now designs the matching in such a manner that the mentioned value is achieved with an empty vehicle, then there results an unequivocally overbraked front axle for the fully loaded vehicle and therewith a longer brake path. If, in contrast thereto, one designs the matching in such a manner that it is correct with a fully loaded vehicle, then there results for the empty vehicle, for example, already at about 0.5, an overbraked rear axle and therewith an unstable braking behavior.

The present invention is concerned with the task to constitute the installed brake force distribution so as to be shiftable. The underlying problems are solved as a rule in that a shiftable pressure reducing valve is installed into the rear axle circuit whose shifting position is determined, for example, by way of an electric pulse in dependence on the rear axle load. The additionally installed pressure reducing valves are expensive. Furthermore, pressure reducing valves are sensitive against soiling and therefore are not always reliable over long periods of time. Consequently, the present invention additionally aims at avoiding these described disadvantages.

The posed task is solved according to the present invention with the master brake cylinders described hereinabove in that the piston for the front axle brake circuit has a larger diameter than that for the rear axle brake circuit, and in that the pressure space for the front axle brake circuit and that for the rear axle brake circuit are connected with each other by a line in which is arranged a control valve operable in dependence on the vehicle load. The present invention therefore has as its subject the general concept to undertake the shifting in the master brake cylinder itself and to thereby economize any additional pressure reducing valves which othewise might be required.

It is additionally proposed by the present invention hat the pressure space for the front wheel brakes is separated from that for the rear wheel brakes by an intermediate piston which is freely movable in a guide sleeve of smaller diameter and is provided on both sides with central or coaxial extensions for the cooperation with the two pressure pistons, respectively, in case of failure of the pressure medium. The present invention thereby proceeds in such a manner that the area ratio of intermediate piston to rear axle piston corresponds to the desired pressure ratio of front-to-rear axle brake circuit with an empty vehicle.

The arrangement can be made according to the present invention in such a manner that a valve is arranged in the connecting line which interrupts this line with an empty vehicle and relieves the rear axle pressure space into a refill-tank whereas with full vehicle, it opens up the line and blocks the connection to the refill-tank. This valve may be constructed as solenoid valve opening when energized. The control itself can take place in such a manner that the load condition is picked up at the rear axle, and more particularly with a coil spring system, in the center of the torsion rod stabilizer, and with a hydropneumatic spring system, for example, as the pressure in the spring leg. Correspondingly installed switches then shift over when exceeding or dropping below a predetermined load limit. The present invention thereby primarily contemplates that two positions suffice as a rule for the shifting operation.

In another embodiment according to the present invention, a solenoid valve may be provided in the connecting line and may be controllable by a pulse sequence which in its turn is controllable corresponding to the vehicle load. The possibility would result therefrom to provide this shifting system not only with two positions but with more than two positions, and to continuously adapt the pressure ratio, so to speak of. Additionally, the possibility results in that case to take into consideration also other influences in addition to the load. It may furthermore be particulaly appropriate if the pulse-pause ratio of the pulse sequence is selectable or variable. One possesses in this manner the possibility to additionally intercede also in the operation in a controlling manner in that, for example, during a sharp braking action, the mentioned pulse-pause ratio is a different one than during a weak braking, for example, in that the pulses become longer and the pauses become shorter.

Accordingly, it is an object of the present invention to provide a master brake cylinder for motor vehicles which avoids by simple means the aforementioned shortcomings and drawbacks encountered in the prior art.

Another object of the present invention resides in a master brake cylinder for motor vehicles in which the installed brake force distribution is shiftable by simple and operationally reliable means.

A further object of the present invention resides in a master brake cylinder for use with a two-circuit brake system of motor vehicles in which expensive reducing valves are avoided and the system is less prone to troubles due to soiling.

Still another object of the present invention resides in a master brake cylinder for motor vehicles of the type described above which increases the reliability of operation over long operating periods.

These and other objects, features and advantages of the present invention will become more apparent from the following description when taken in connection with the accompanying drawing which shows, for purposes of illustration only, one embodiment in accordance with the present inventin, and wherein.

Figure 1:
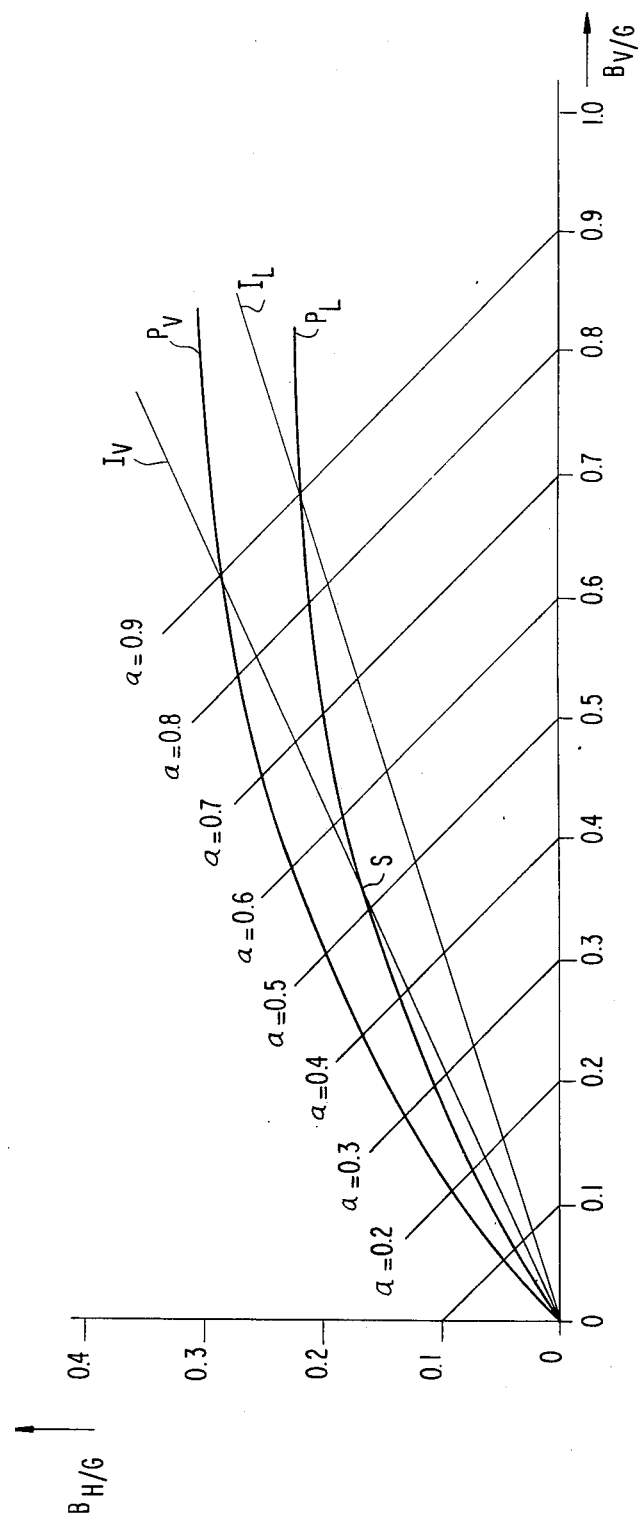
FIG. 1 is a brake-force distribution diagram.

Referring now to the drawing wherein like reference numerals are used throughout the various views to designate like parts, FIG. 1 illustrates the parabola $P_V$ of the ideal brake-force distribution for a fully loaded vehicle. Furthermore, the parabola $P_L$ of the ideal brake-force distribution for the empty vehicle can be recognized in this figure. If one were now to so design the installed brake-force distribution $I_V$ for the fully loaded vehicle that it intersects the parabola $P_V$ at 0.9, then an overbraked rear axle and therewith an unstable brake behavior would result from the point of intersection S with the parabola $P_L$ already above 0.5. If, however, one were to design the installed brake-force distribution $I_L$ for the empty vehicle, then an unequivocally overbraked front axle and a longer brake path would result for the fully loaded vehicle over the entire range. It can be readily recognized from this figure that a shifting of the installed brake-force distribution is highly desirable.

Figure 2:
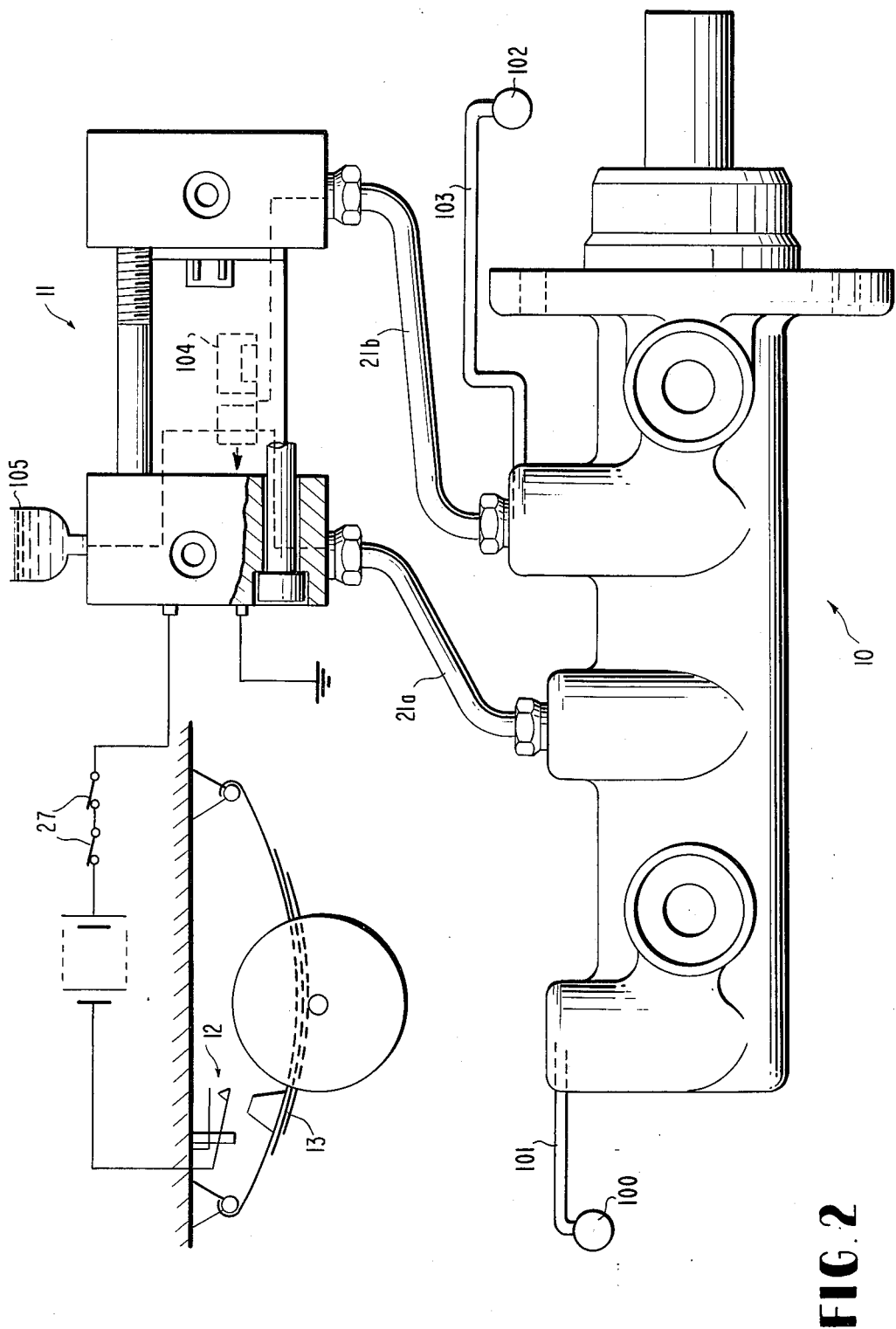
FIG. 2 is a somewhat schematic elevational view of a master brake cylinder with a shifting valve, showing the control system schematically.

According to FIG. 2, a magnetically controlled shifting valve 11 is coordinated to the master brake cylinder generally designated by reference numeral 10. The solenoid shifting valve 11 is constructed as a conventional valve which opens when energized. It is closed with an empty vehicle and, in case of a loaded vehicle, is supplied with current by a switch 12 which is coordinated to the rear axle spring 13 and is closed with fully loaded vehicle as a result of the spring-deflection of the rear axle spring 13.

Figure 3:
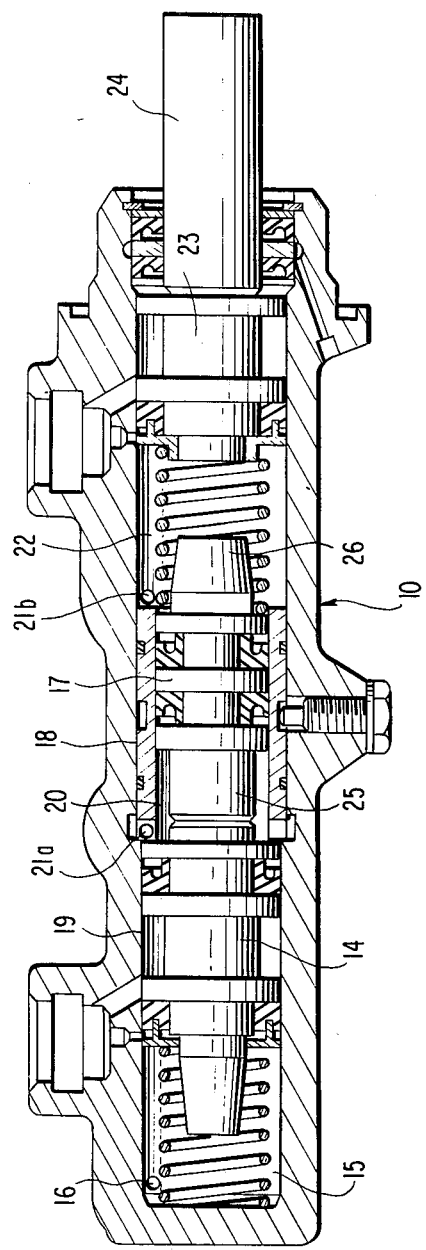
FIG. 3 is a longitudinal cross-sectional view through the master brake cylinder.

According to FIG. 3, a floating piston 14 is disposed in the housing of the master brake cylinder 10, which delimits a space 15, from which branches off the line 16 to the rear axle brakes 100 via line 101. An intermediate piston 17 is disposed in a sleeve 18 which has a smaller inner diameter than the housing bore 19 accommodating the floating piston 14. The intermediate piston 17 is freely movable in the sleeve 18 which, in its turn, is fixedly installed into the housing. A space 20 is disposed between the floating piston 14 and the intermediate piston 17 which is connected by a connecting line 21a and 21b (FIG. 2) by way of the solenoid valve 11 with the pressure space 22 for the front axle brakes 102 via line 103. This pressure space 22 is closed off by the pressure rod piston 23 which is actuated by means of the pressure rod 24 either directly from the brake pedal or from a brake booster. The intermediate piston 17 has on both sides coaxial extensions 25 and 26 for the cooperation with the floating piston 14, on the one hand, and the pressure rod piston 23, on the other, in case any brake circuit should fail.

Normally the solenoid valve 11 which includes a shifting member 104 as schematically illustrated in dashed line in FIG. 2 is closed, i.e., the part 21b of the connecting line is connected with the front axle brakes whereas the part 21a of the connecting line as shown in dashed line is relieved toward a refill tank 105 by conventional means. If the pressure rod 24 is now actuated, then a pressure builds up in the space 22 which acts directly on the front axle brakes by way of the line 21b. However, the intermediate piston 17 is displaced toward the left by this pressure and takes along the floating piston 14 by means of its central extension 25. A pressure is therefore being built-up in the space 15 which, corresponding to the area ratio between the floating piston 14 and the intermediate piston 17, is smaller than the pressure in the space 22. This smaller pressure is conducted to the rear axle brakes 100 by way of the connection 16 via line 101. Since during this movement the volume in the space 20 increases, brake fluid is refilled in that case by way of the line 21a also from the refill tank If the vehicle is now fully loaded, then the switch 12 closes and the solenoid valve 11 opens with the shifting member being shifted in the direction of the arrow. This means, in this position the two line sections 21a and 21b ae connected with each other whereby the refill tank is disconnected. The pressure acting on the front axle brakes from the space 22 therefore continues directly into the space 20 and—since the floating piston 14 cannot absorb any forces—into the space 15. Consequently, the same pressure acts on the rear axle brakes as on the front axle brakes. Two safety switches 27 are now further provided in the energizing circuit of the solenoid valve 11, which are arranged as floating witches in the refill tanks of the front axle brake circuit and of the rear axle brake circuit and which open in case of defects in these brake circuits. As a result thereof, the solenoid valve 11 also becomes de-energized if with a fully loaded vehicle, the switch 12 has closed. If, therefore, for example, the front axle brake circuit should fail, i.e., therefore no pressure build-up is possible any longer in the space 22, then the pressure piston 23 is displaced so long until it impinges against the central pin 26 of the intermediate piston 17 and thereby pushes the same in front of itself. The intermediate piston 17, in its turn, then pushes mechanically in front of itself in a manner already described the floating piston 14 so that pressure for the rear axle can be built-up in the space 15. With a given actuating force at the pressure rod 24, this actuating pressure is larger in the space 15 corresponding to the area ratio of the two pistons 14 and 17 than during normal actuation.

If now the rear axle circuit fails, i.e., no pressure build-up is possible any longer in the space 15, then the floating piston 14 deflects toward the left up to the abutment at the housing. When this has taken place, pressure can build-up in the usual manner in the space 22 for the front axle brake circuit.

The described master brake cylinder is therefore also operational when defects occur in one of the two brake circuits. It was already mentioned that in lieu of the described solenoid valve, a pulse valve of conventional, commercially available construction can be used which then releases pulse-wise in the direction toward the space 15, the pressure build-up in the space 22 corresponding to the load of the vehicle. The pulse-sequence or pulse-length can thereby be controlled—as already described—corresponding to the vehicle load by conventional means which form no part of the present invention and are, therefore, not described in detail herein since they involve commercially available parts.

Figure 4:
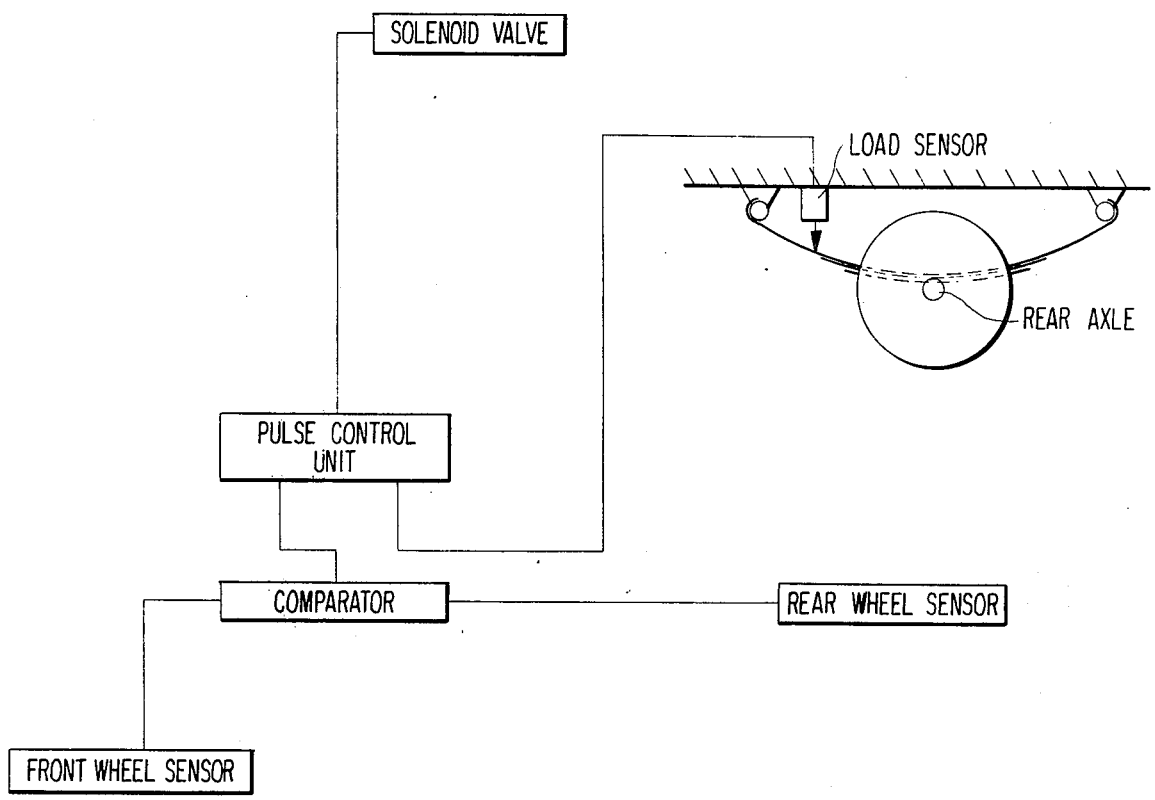
FIG. 4 is a schematic block diagram depicting a control system in accordance with the present invention.

It should additionally be mentioned for the sake of completeness that with the pulse control of the solenoid valve, as already mentioned hereinabove, a particularly appropriate effect is attainable if the pulse sequence is controlled again by known conventional means on the basis of a slippage difference of the wheels, and more particularly in such a manner that the slippage of the front wheels is always larger by a predetermined amount than the slippage of the rear wheels. This difference may amount, for example, to 10% and can be achieved by conventional electronic means, utilizing commercially available logic circuits as are known for purposes of controlling the slippage. Such a system is schematically shown in block diagram in FIG. 4.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modificaions as are encompassed by the scope of the appended claims.

I claim:

1. A master brake cylinder for two-circuit brake systems of motor vehicles, which comprises two cylinder and piston means for the two brake circuits disposed in tandem arrangement one behind the other and forming pressure spaces in the master brake cylinder, characterized in that the piston means for the front axle brake circuit has a larger diameter than the piston means for the rear axle brake circuit, and in that the pressure space in the master brake cylinder for the front axle brake circuit is connected with the pressure space in the master brake cylinder of the rear axle brake circuit by way of a connecting line means, and control means operable in dependence on the vehicle load and operative in said connecting line means.

2. A master brake cylinder according to claim 1, characterized in that the pressure space for the front axle brakes is separated from the pressure space for the rear axle brakes by an intermediate piston means, which is freely movable in a guide sleeve means of smaller diameter, said intermediate piston means including extensions on both sides for the mechanical cooperation with the two pressure piston means.

3. A master brake cylinder according to claim 2, characterized in that the extensions are coaxial.

4. A master brake cylinder according to claim 2, characterized in that area ratio of intermediate piston means to rear axle piston means corresponds to the desired pressure ratio of front axle brakes to rear axle brakes with a substantially empty vehicle.

5. A master brake cylinder according to claim 4, characterized in that said control means includes a valve means arranged in the connecting line means which interrupts said connecting line means in case of a substantially empty vehicle and relieves the rear axle pressure space into a refill tank whereas said valve means opens up said connecting line means with substantially a full vehicle while it then blocks the connection to the refill tank.

6. A master brake cylinder according to claim 5, characterized in that the valve means is a solenoid valve which opens when energized.

7. A master brake cylinder according to claim 4, characterized in that the control means includes a solenoid valve means in the connecting line means which is controllable by a pulse sequence, and further means for controlling the pulse sequence corresponding to the vehicle load.

8. A master brake cylinder according to claim 7, characterized in that the pulse sequence is controllable by said further means in dependence on the slippage difference of the wheels in such a manner that the slippage at the front wheels is always larger by a predetermined amount than the slippage at the rear wheels.

9. A master brake cylinder accordng to claim 1, characterized in that said control means includes a valve means arranged in the connecting line means which interrupts said connecting line means in case of a substantially empty vehicle and relieves the rear axle pressure space into a refill tank whereas said valve means opens up said connecting line means with substantially a full vehicle while it then blocks the connection to the refill tank.

10. A master brake cylinder according to claim 9, characterized in that the valve means is a solenoid valve which opens when energized.

11. A master brake cylinder according to claim 1, characterized in that the control means includes a solenoid valve means in the connecting line means which is controllable by a pulse sequence, and further means for controlling the pulse sequence corresponding to the vehicle load.

12. A master brake cylinder according to claim 11, characterized in that the pulse sequence is controllable by said further means in dependence on the slippage difference of the wheels in such a manner that the slippage at the front wheels is always larger by a predetermined amount than the slippage at the rear wheels.

13. A master brake cylinder according to claim 1, characterized in that the control means is operable in dependence on the vehicle load for controlling the establishment of a connection of the pressure space for the front axle brake circuit with the pressure space of the rear axle brake circuit by way of the connecting line means.

14. A master brake cylinder according to claim 13, characterized in that the control means includes a valve means arranged in the connecting line means for establishing the connection of the pressure space for the front axle brake circuit with the pressure space of the rear axle brake circuit with a substantially full vehicle and for interrupting the connection in case of a substantially empty vehicle.

15. A master brake cylinder according to claim 14, characterized in that the valve means enables a relieving of the rear axle pressure space into a refill tank in case of a substantially empty vehicle and blocks the relieving of the rear axle pressure space into the refill tank in the case of a substantially full vehicle.

* * * * *